N. DRAG.
AUTOMATIC RODENT TRAP.
APPLICATION FILED JUNE 25, 1919.
1,335,882.
Patented Apr. 6, 1920.
3 SHEETS—SHEET 1.
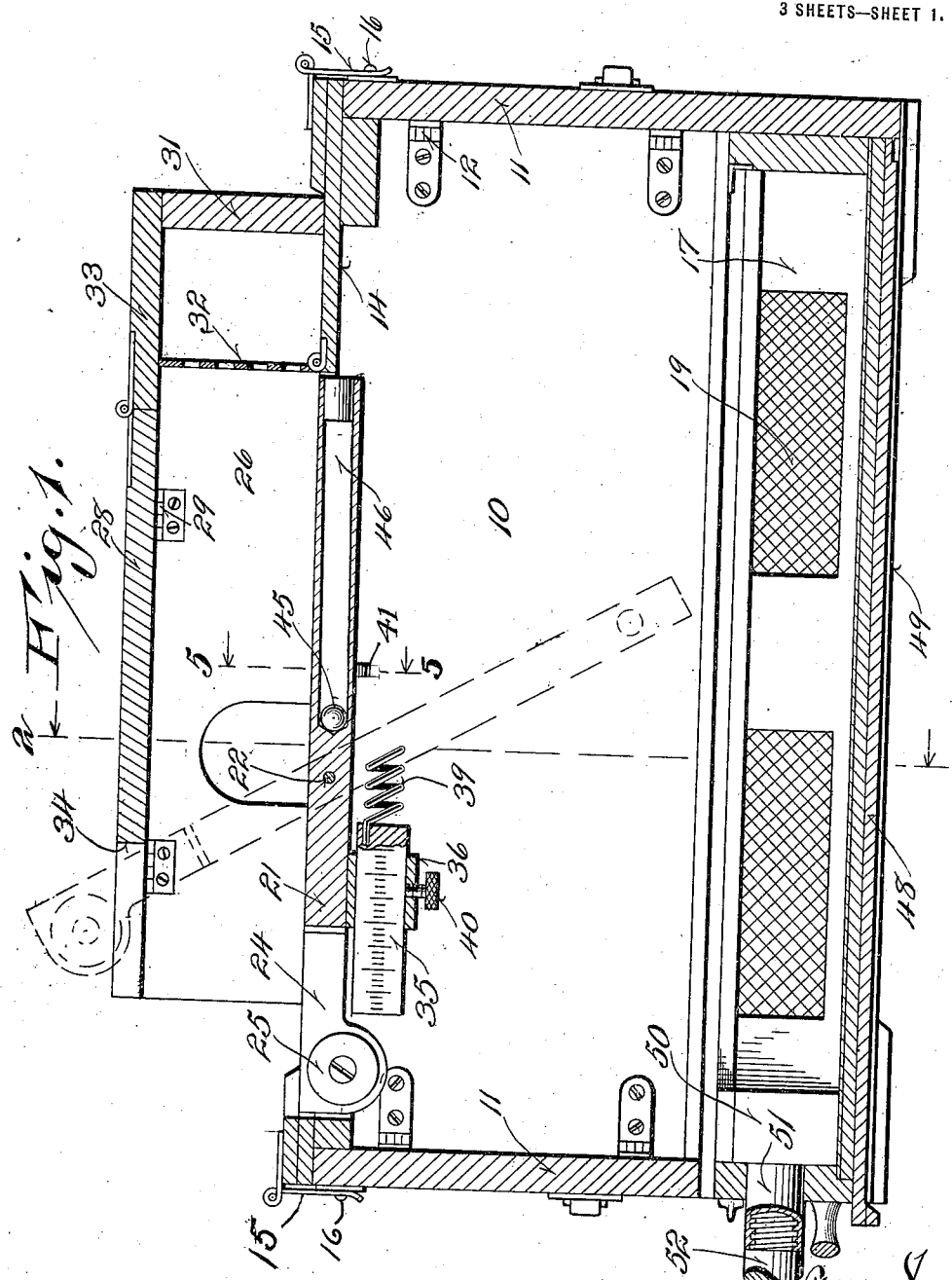

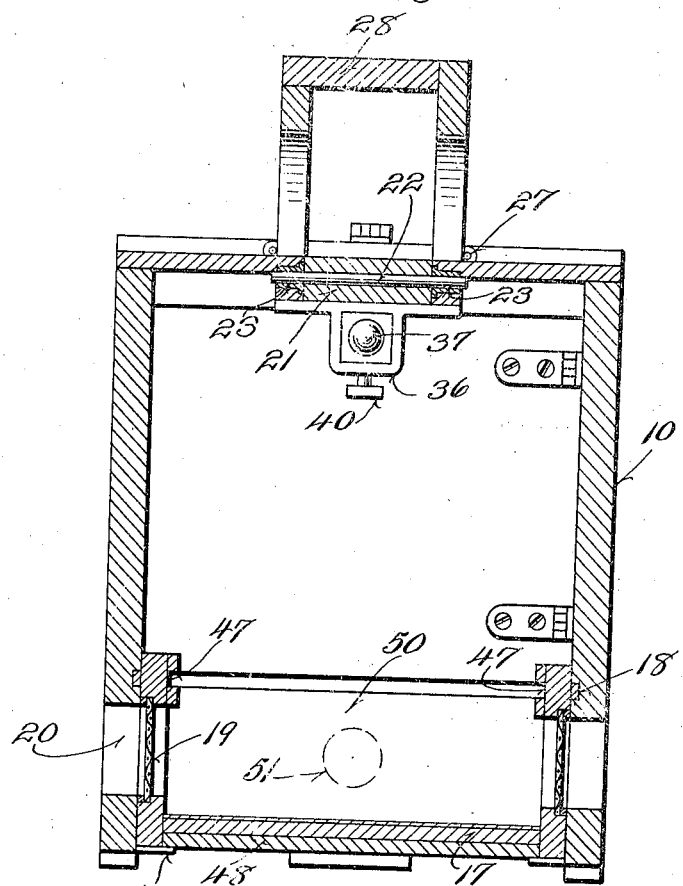
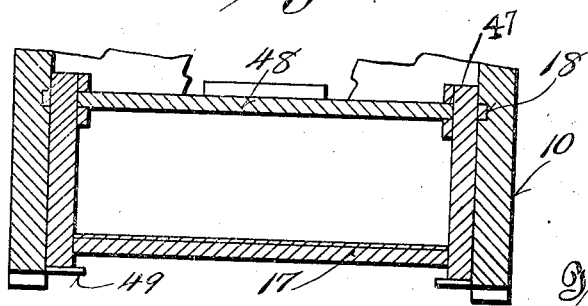

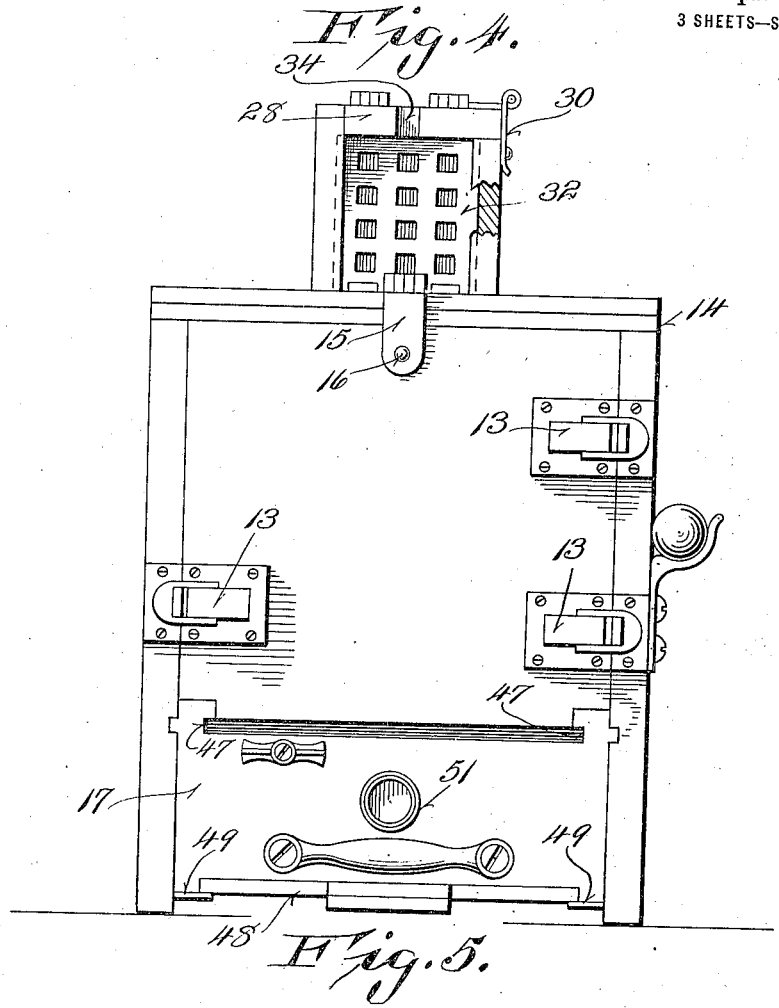

UNITED STATES PATENT OFFICE.

NICHOLAUS DRAG, OF MILWAUKEE, WISCONSIN.

AUTOMATIC RODENT-TRAP.

1,335,882.  Specification of Letters Patent.  Patented Apr. 6, 1920.

Application filed June 25, 1919. Serial No. 306,667.

*To all whom it may concern:*

Be it known that I, NICHOLAUS DRAG, a citizen of Poland, and a resident of Milwaukee, in the county of Milwaukee and State of Wisconsin, have invented certain new and useful Improvements in Automatic Rodent-Traps; and I do hereby declare that the following is a full, clear, and exact description thereof.

My invention relates to new and useful improvements in traps for rats and mice or other rodents, and more particularly of that type including a box forming a trap chamber and having a trap door in its top over which is disposed a passageway leading to a bait chamber, whereby the rodent will upon entering the passageway, be projected downwardly into the trap chamber by yielding of the trap door, which, as soon as the weight of the rodent is removed, will assume its initial position thus automatically resetting the trap whereby any number of rodents may be caught thereby.

It is in general the object of my invention to simplify and otherwise improve the construction of traps of this character, and to increase the operative efficiency of such traps.

It is more particularly an important object of my invention to provide a trap structure of this character having its parts so arranged that when the trap is not in use, said parts may be folded and otherwise arranged so as to occupy a minimum amount of space, the foldable and knock-down relation of parts being such as to permit a most ready operative reassembly of the trap structure.

A further object of my invention resides in the provision of an arrangement for procuring a most sensitive and rapid operation of the trap door when the rodent is properly positioned thereon, and to procure a rapid return of the trap door to reset position, and to this end I contemplate the provision of detent means effective to prevent premature operation of the trap door, and suddenly yieldable to permit a rapid opening movement of the door under the weight of the rodent.

A still further and important object of my invention resides in the provision of an arrangement for killing rodents which have been trapped in the trap chamber, by crushing or compacting the rodents against the end of the chamber, and to this end it is more particularly my object to provide an arrangement for closing off a portion of the chamber to form a crushing space or death chamber.

With the above and other objects and advantages in view, which will be apparent as the description proceeds, my invention resides in the novel features of construction, combination and arrangement of parts which will be hereinafter more particularly described and defined by the appended claims.

In the accompanying drawings:

Figure 1 is a vertical longitudinal sectional view through an automatic rat trap embodying my invention.

Fig. 2 is a transverse sectional view therethrough on a plane indicated by the line 2—2 of Fig. 1.

Fig. 3 is a detail sectional view taken transversely through the lower portion of the trap chamber and showing said lower portion closed off for killing rodents therein.

Fig. 4 is an end view of the trap.

Fig. 5 is a detail sectional view through the detent means for the trap door, as indicated by the line 5—5 of Fig. 1.

Referring now more particularly to the drawings, the main chamber of my improved trap comprises side walls 10 and end walls 11, said walls being detachably and foldably connected together by hinges 12 connecting the end walls with one of the side walls and by preferably conventional clasps 13 connecting the end and side walls and secured to the outer surfaces of the end walls. A cover 14 is provided for the chamber, which seats on the walls and this cover is detachably secured in place by latch members 15 on its ends engageable with keepers 16 on the end walls. The bottom of the chamber is closed by a drawer 17 which is slidably mounted therein by longitudinal ribs 18 on its sides engageable in corresponding grooves of the side walls 10. The side walls of the drawer are provided with screen window-openings 19 which register with corresponding openings 20 in the main chamber walls 10 whereby the interior of the trap chamber may be viewed to determine what has been caught therein.

A trap door 21 is disposed in a longitudinal slot in the cover portion of the chamber, said trap door being mounted on a pivot bolt 22 passed transversely through its intermediate portion and having its ends engaged in bearings 23 carried by the cover. One end of the trap door is provided with a reduced extension 24 which is weighted at 25 whereby the trap door normally assumes a reset or closed position. To provide a passageway over the trap door whereby the rodents to be trapped will properly tread on the door, passage walls 26 are secured longitudinally on the cover 14 by hinges 27, a top 28 being secured by hinges 29 to one of the walls and connected by a latch 30 with the other wall, whereby said passageway structure may be folded or collapsed when not in use. One end of the passageway structure thus formed is closed by an end wall 31 connected by a hinge (not shown) with any adjacent portion, and a hinged foraminous wall 32 is provided in the passageway adjacent the end wall 31 and at the end of the trap door slot to define a bait chamber to which access is had through a hinged door 33 in the top 28 of the passageway. At the entrance end of the passageway, said top is provided with a slot 34 receiving the reduced weight extension 24 of the trap door when the trap door is tilted, abutment of said extension with the end of the slot forming a positive stop for downward tilting movement of the trap door. To assist in procuring a rapid returning movement of the trap door after a rodent thereon has been projected into the trap chamber, a bar 35 is adjustably secured in a sleeve 36 under the forward end portion of the trap door. A coiled buffer spring has one end secured to the inner end of the bar 35 and normally projects into the path of downward tilting movement of the trap door. Thus the trap door in its tilting movement would engage and compress the spring to procure a resilient force materially assisting in the rapid returning movement of the trap door. Adjustment of the bar 35 in the sleeve 36 is effected by a set screw 40 threaded in the sleeve and engaging the bar, and the adjusted position of the bar obviously determines the degree of tension imparted to the spring 39.

To provide a detent mechanism which will delay operation of the trap door until the rodent is properly positioned thereon, and then expedite the tilting movement of the trap door, a plunger 41 is slidably disposed in a sleeve 42 at one side of the downward tilting portion of the trap door and this plunger has a spear head engageable with a wear plate 43 set into the side of the trap door, said plunger being urged toward the trap door by a spring 44 coiled on the plunger. The upper side edge portion of the wear plate is beveled inwardly to provide a cam surface coacting with the inclined head surface of the plunger. When the trap door is closed, the apex of the plunger head bears against the wear plate below its cam surface and thus frictionally opposes tilting movement of the trap door. As soon, however, as tilting movement of the trap door is started by sufficient amount of weight thereon, the plunger head will engage the beveled cam surface of the wear plate to urge the trap door downwardly by the force of the spring 44. The rapid tilting movement of the trap door is also facilitated by a ball-weight 45 which rolls in a longitudinal passageway 46 in the trap door, the weight being normally disposed adjacent the pivot of the trap door. As the door starts to tilt however, the weight rolls away from the pivot, thus increasing its leverage action in tilting the trap door.

The drawer 17 is provided with longitudinal channels 47 at the upper edge portions of its side walls which are adapted to receive the edges of a slide plate 48, as shown particularly in Fig. 3, whereby to close off the space of the drawer and confine the trapped rodents therein. When not in use to close the drawer this slide plate is slid under the drawer and held by engagement of its edges on trackways 49 thereunder. A piston 50 is slidable in the drawer, corresponding in shape to the cross sectional area of the drawer and this piston carries a sleeve 51 adapted to project through the front wall of the drawer for detachable engagement, preferably by the threaded connection shown in Fig. 1, with a plunger rod 52 which, when not in use to actuate the piston, is supported by a bracket 53 on the side of the main chamber, as shown in Fig. 4.

I will now describe the general operation of the trap. Rodents are induced to enter the passageway on top of the trap by bait in the screened off chamber at the remote end of the passageway and as the rodent traverses the passageway, the trap door suddenly yields and precipitates the rodent into the main trap chamber, immediately regaining its closed or reset position to thus automatically provide for trapping other rodents. When it is desired to exterminate the rodent or rodents caught in the trap chamber, the slide plate 48 is removed from under the drawer 17 and slid into the trap chamber, thus confining the rodents in the drawer. The plunger rod 52 is then connected with the piston 50 and the piston is forced through the drawer by means of this rod, thus compacting the rodents in the end of the drawer and killing them, whereupon the drawer may be removed from the trap chamber and the dead rodents dumped out.

While I have shown and described a preferred embodiment of my invention, it will be appreciated that various changes and modifications of structure within the scope of the appended claims may be employed to meet differing conditions of use, and manufacture, without departing in any manner from the spirit of my invention.

What is claimed is:

1. A trap of the character described comprising a trap chamber, means for trapping rodents in the chamber, means for closing off a portion of the chamber, and a piston movable through said portion of the chamber for crushing rodents therein.

2. A trap of the character described comprising a trap chamber, a trap inlet in the upper portion of the chamber, a drawer slidable in the lower portion of the chamber, a piston slidable in the drawer, a member on the piston adapted to project through the end of the drawer, and a plunger rod adapted for detachable connection with said piston member.

3. A trap of the character described comprising a trap chamber, a trap door pivoted at the upper portion of the chamber and having an inclined surface at one side, and a spring urged plunger movable transversely of the path of movement of the trap door and engageable with said inclined surface of the trap door to expedite tilting movement thereof.

4. A trap of the character described comprising a trap chamber including side and end walls having knock-down connection, a cover, means for securing said cover on the upper edges of the walls, a trap door extending longitudinally in the cover, longitudinal passage-walls hinged to the cover at the sides of the trap door, a passageway top hinged to one of said passage-walls, and means for securing said passageway top to the other passage-wall.

In testimony that I claim the foregoing I have hereunto set my hand at Milwaukee, in the county of Milwaukee, and State of Wisconsin.

NICHOLAUS DRAG.